UNITED STATES PATENT OFFICE.

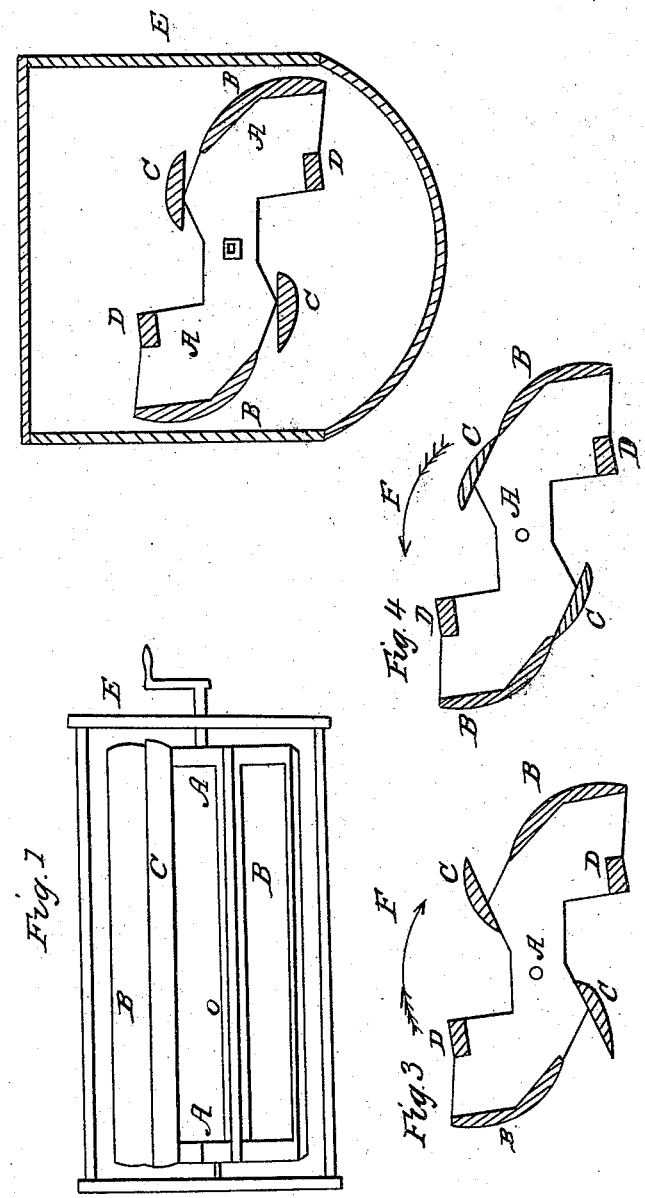

R. W. DAVIS, OF RODGERSVILLE, NEW YORK.

CHURN.

Specification of Letters Patent No. 7,233, dated April 2, 1850.

*To all whom it may concern:*

Be it known that I, ROBERT W. DAVIS, of Rodgersville, in the county of Steuben and State of New York, have invented certain Improvements in Self-Adjusting Rotary Churn-Dashers, and that the following is a full, clear, and exact description of the principle or character which distinguishes them from all other things before known and of the usual manner of making, modifying, and using the same, reference being had to the accompanying drawings, in which—

Figure 1, is a section of the churn box showing the revolving dasher. Fig. 2 is a cross section through the box and dasher. Fig. 3 is a section of the dasher with the movable floats open. Fig. 4 is a section of the dasher with the movable floats shut.

My improvements are designed to effect the purposes of churning in the most effectual manner, and of afterwards gathering the butter and working it to expel the buttermilk. These objects are attained in my churn by forming the revolving dasher so that when turning in one direction the cream is agitated by meeting with the slats of the dasher, which are set at such angles as to force the cream toward the center. It is then met my movable slats which when revolving in this direction stand open and cause the cream to move outward, which various and contrary motions so agitate it, that the butter is soon formed. In order to gather the butter and work it, the dasher is then turned in the contrary direction, and the movable slats then closing the outside of the slats of the dasher form a uniform curve concentric to the axis and moving with the convex side foremost. By a few revolutions of the dasher the butter is thrown from the center to the sides and bottom of the churn box, and these gathered into a roll. The milk may then be drawn off, and by continuing the motion of the dasher the butter is pressed against the sides of the churn and worked entirely free from milk.

In the drawings (A) are the sides of the revolving dasher, with the slats or floats (B) affixed.

(C) are the movable floats which are attached by hinges to points or angles on the sides (A).

(D) are slats which serve to strengthen the dasher.

(E) is the churn box.

F are arrows showing the direction of the motion.

Having thus fully described my improvements in revolving churn dashers, what I claim as new therein and for which I desire to secure by Letters Patent is—

The self adjusting float or slot (C) which opens when churning the cream and closes of itself when the dasher is turned in the opposite direction to gather the butter as before described.

R. W. DAVIS.

Witnesses:
EDWARD EVERETT,
JOHN L. SMITH.